United States Patent [19]

Hyldal

[11] 4,348,621
[45] Sep. 7, 1982

[54] CONTROL CIRCUIT FOR A MULTI-PHASE LOAD

[75] Inventor: Jørgen Hyldal, Guderup, Denmark

[73] Assignee: Danfoss A/S, Nordborg, Denmark

[21] Appl. No.: 222,128

[22] Filed: Jan. 2, 1981

[30] Foreign Application Priority Data

Jan. 8, 1980 [DE] Fed. Rep. of Germany ....... 3000403

[51] Int. Cl.³ .............................................. H02K 29/02
[52] U.S. Cl. ..................................... 318/254; 318/138
[58] Field of Search ................................ 318/254, 138

[56] References Cited

U.S. PATENT DOCUMENTS

| | | | |
|---|---|---|---|
| 3,924,167 | 12/1975 | Clark | 318/254 |
| 3,931,562 | 1/1976 | Visscher | 318/685 |
| 3,940,670 | 2/1976 | Tanikoshi | 318/254 |

Primary Examiner—B. Dobeck
Assistant Examiner—S. M. Bergmann
Attorney, Agent, or Firm—Wayne B. Easton

[57] ABSTRACT

The invention relates to a control circuit for a brushless type DC motor of the type having a permanent magnet rotor and a pair of poles provided with two windings, the windings having a common junction which is connectable to the positive terminal of a DC voltage source. A pair of controllable switching elements are in respective series with the windings. A symmetrical square wave pulse generator responsive to the angular position of the rotor switches the switching elements on and off in a push-pull mode. The control circuit processes the square wave output and has dual outputs for driving the switching elements with the dual outputs having alternate pulses in time spaced relation to each other for driving the switching elements in underlapping relation to each other to prevent the elements from drawing current from the common junction at the same time.

2 Claims, 4 Drawing Figures

Fig.1
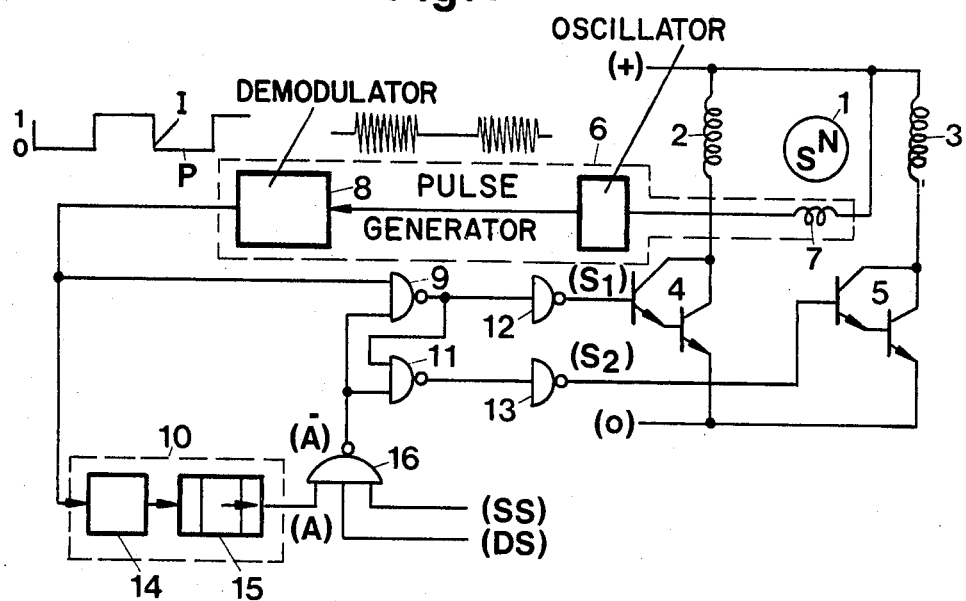
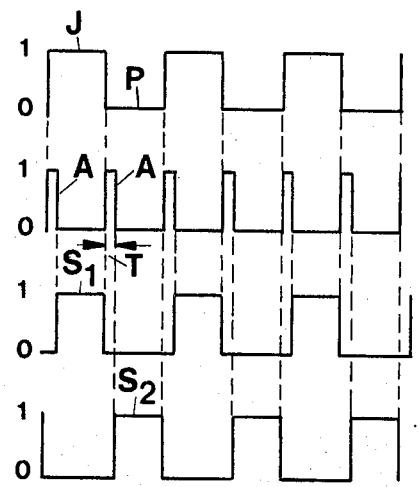
Fig.2

Fig. 3
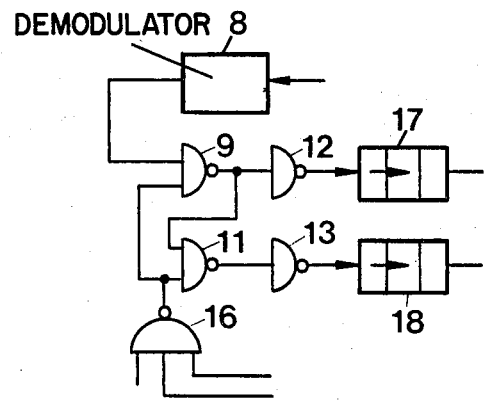
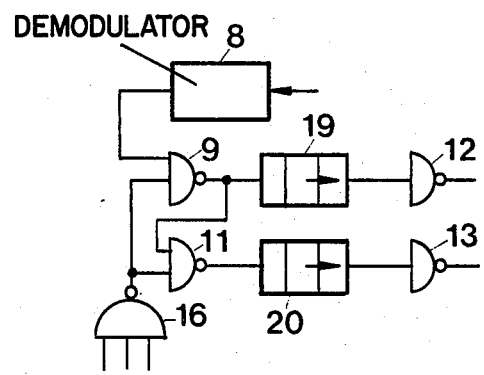
Fig. 4

CONTROL CIRCUIT FOR A MULTI-PHASE LOAD

The invention relates to a control circuit for a multi-phase load, particularly a two-phase brushless D.C. motor, wherein each phase comprises a controllable switching element of semi-conductor material, particularly of transistors in Darlington connection, and a load portion in series applied to a D.C. voltage source, and wherein the switching elements can be successively switched on and off in a cyclic sequence by switching pulses.

In a known control circuit of this kind, spark interferences are set up during the switching operations of the switching elements.

The invention is based on the problem of providing a control circuit of the aforementioned kind in which spark interferences are for the most part avoided.

According to the invention, this problem is solved in that a dead time is disposed between all adjacent switching pulses in the switching sequence.

The stated solution is based on the recognition that in semi-conductor switching elements, particularly transistors in Darlington connection, the current cut-off delay time is longer than the current switching on delay time. If, therefore, immediately upon the cut-off of the switching pulse from the control connection of the one switching element the switching pulse is applied to the control connection of the next switching element in the sequence, the conductive states of both switching elements overlap by the difference between the current switching on and current cut-off delay times. During the period of this overlap a very much higher operating current can therefor flow in the common conductor leading to the load and give rise to consequent spark interferences. By Allowing for a dead time between all adjacent switching pulses in the sequence, such a conductive current overlap is substantially or completely avoided so that spark interferences are accordingly avoided.

The dead time is chosen to be considerably shorter than one switching pulse, i.e. considerably shorter than the time during which a switching element is fully conductive. It is preferably in the order of about 10 microseconds. This results in a favourable compromise which on the one hand ensures adequate damping of spark interferences and on the other hand does not give an excessively high commutation error in the case of short switching pulses or high rotary speeds.

A particularly simple construction of the control circuit is obtained if the front flank of all switching pulses is retarded in relation to the rear flank of the respective immediately preceeding switching pulse.

Thus, a control circuit in which the switching pulses are derived from the pulses of a pulse generator can be so constructed so that a blocking pulse with a period corresponding to the dead time is releasable by all flanks of the pulses from the pulse generator and the blocking pulses are alternately linked to the coincident pulses and pulse intervals of the pulse generator for forming the switching pulses. The blocking pulses in each case block an initial section of each pulse or pulse interval respectively associated to a phase, thereby resulting in a simple manner in switching pulses having intervals corresponding to the period of the blocking pulses.

Further, the pulses of the pulse generator can be fed to a time switching element which responds to both flanks of each of these pulses on emission to produce actuating pulses which are subsequently inverted to form the blocking pulses. Although it is also possible to provide each phase with its own time switching element, a single time switching element is in this case adequate for all phases.

This time switching element can be constructed so that it comprises a zero detector producing a spike pulse for each input pulse flank in cascade with a retarding element which retards only the rear flank of its input pulse. By simple inversion, the blocking pulses can then be formed from the output pulses of this retarding element.

Preferred examples will now be described in more detail with reference to the drawings, wherein:

FIG. 1 is a block circuit diagram of a control circuit according to the invention;

FIG. 2 is a pulse diagram for explaining the function of the FIG. 1 control circuit;

FIG. 3 is a first modification of the FIG. 1 control circuit, and

FIG. 4 is a second modification of the FIG. 1 control circuit.

FIG. 1 represents a control circuit for a brushless two-phase D.C. motor with a two-pole permanent magnet rotor 1 and two stator windings 2 and 3. The stator windings 2, 3 are respectively in series with a switching element 4 and 5 of two transistors in Darlington connection at the poles (+) and (0) of a D.C. operating voltage source.

A pulse generator 6 comprises a sensor 7 in the form of a coil with a saturatable core for detecting the rotary position of the rotor 1 and an oscillator which co-operates with the sensor 7 and the oscillations of which are alternately switched on and off after each half rotor rotation by a change in the inductance of the sensor 7. The change in inductance is effected by the rotation of the rotor 1. The oscillations of the oscillator are rectified and smoothed in a demodulator 8 downstream of the oscillator, so as to result in rectangular symmetric pulses I. The pulses I of the pulse generator 6 are fed to the input of a NAND element 9 and a time switching element 10. The output of the NAND element 9 is connected directly to the input of a second NAND element 11 and, by way of a NOT element 12 (also termed inverter stage) to the control connection of the switching element 4. The output of the NAND element 11 is connected to the control connection of the switching element 5 by way of a NOT element 13.

On the input side, the time switching element 10 comprises a zero detector 14 which produces one (positive) spike pulse for each flank of a pulse I. The zero detector 14 is followed by a retarding element 15 in the form of a monostable trigger element which retards only rear flank of its input pulse (the transition from 1 to 0) and feeds an actuating pulse A prolonged in relation to the spike pulse to the input of a downstream NAND element 16 which has two further inputs to which a start-stop signal SS or a speed control signal DS can be fed. The output of the NAND element 16 is connected to the two other inputs of the NAND elements 9 and 11.

During operation of the motor, it is assumed that the signals SS and DS are 1 signals so that the NAND element 16 can be regarded as a simple NOT element. During each rotation of the rotor, the pulse generator 6 then produces a pulse I and an equally long pulse interval P. The switching element 10 derives from each flank of the pulses I an actuating pulse A which is considerably shorter than the pulse I. By way of the NAND element 16, such an actuating pulse A will then release a blocking pulse $\overline{A}$ (an 0 signal) of the same duration at the inputs of the NAND elements 9 and 11 connected to the NAND element 16. If the blocking pulse was derived from the front flank of a pulse I, it will block an equally long section at the beginning of the pulse I so that at the output of the NOT element 12 there will arise a switching pulse $S_1$ which is shorter than the pulse I by the duration of the actuating pulse A or the blocking pulse $\overline{A}$ released thereby and of which the front flank is retarded in relation to that of the pulse I by the duration of the pulse A so that only rear flanks of the pulses I and $S_1$ are coincident.

An actuating pulse A derived from the rear flank of a pulse I again releases an inverted blocking pulse $\overline{A}$ at the output of the NAND element 16 which is now linked with the pulse interval P. Whereas the pulse interval P already imposes an O signal at the output of the NOT element 12, so that the switching pulse $S_1$ disappears and is not influenced by this blocking signal $\overline{A}$, the blocking signal $\overline{A}$ causes the 1 signal fed by the NAND element 9 to the one input of the NAND element 11 to be blocked as a result of the total AND linkage brought about by the elements 11 and 13, i.e. the switching pulse $S_2$ is likewise released only on the disappearance of this blocking signal $\overline{A}$ up to the occurrence of the next pulse I. The switching pulse $S_2$ is therefore retarded in relation to the rear flank of the pulse I and of the switching pulse $S_1$ by the duration of the pulses A.

The switching pulses $S_1$ and $S_2$ alternately switch on (operate) the switching elements 4 and 5 but, between the switching off of the switching element 4 on the disappearance of the switching pulse $S_1$ and the switching on of the switching element 5 on the occurrence of the switching pulse $S_2$, there will occur in the same way as for all following commutations a dead time T (retardation or interval) which is equal to the duration of one actuating pulse A or blocking pulse $\overline{A}$. This dead time T is designed so that during it the switching element of which the switching pulse is just disappearing has sufficient time to pass from the conductive to the nonconductive condition before the next switching element goes from the nonconductive to the states condition on the occurrence of the next switching pulse.

In this way one avoids overlap of the conductive conditions of the switching elements and excessively high load currents during this period of overlap that could give rise to spark interferences.

Modifications of the FIG. 1 example are within the scope of the invention. Thus, the time switching element 10 may be omitted and instead the NAND elements 12 and 13 (as in FIG. 3) or the NAND elements 9 and 11 (as in FIG. 4) may each be followed directly by a retarding element 17 and 18 or 19 and 20, respectively, which retards the front flank (FIG. 3) or the rear flank (FIG. 4) of its input pulse by the dead time T. In both cases, the now free input of the NAND element 16 can have a constant 1 signal or a further control signal applied to it. The signal linkage can be brought about in accordance with laws of switching Boolean algebra or in some other way.

What is claimed is:

1. A DC motor assembly comprising, a permanent magnet rotor, a pair of poles, parallel circuit branches having a pair of windings with a common positive terminal connection for a DC voltage source, a pair of controllable switching elements in said branches in respective series with said windings, detector means for detecting the angular position of said rotor, pulse generating means responsive to said detector means forming a symmetrical square wave output for switching said switching elements on and off in a push-pull mode, drive means responsive to said square wave output having dual outputs for driving said switching elements, said dual outputs having alternate pulses in time spaced relation to each other for driving said switching elements in underlapping relation to each other.

2. A DC motor assembly according to claim 1 wherein said drive means has spacer pulse forming means with a spacer pulse output being formed by positive and negative edge triggering by said square wave output, said drive means including logic means responsive to said square wave output and said spacer pulse output to produce said alternate pulses of said dual outputs.

* * * * *